(12) United States Patent
Baker et al.

(10) Patent No.: US 7,636,163 B2
(45) Date of Patent: Dec. 22, 2009

(54) COLOR MEASUREMENT DEVICE WITH ERROR DETECTION

(75) Inventors: Douglas V. Baker, Middleville, MI (US); Christopher Michael Winczewski, Kentwood, MI (US); Olivier Calas, Jr., Lowell, MA (US)

(73) Assignee: X-Rite, Inc., Grand Rapids, MI (US)

( * ) Notice: Subject to any disclaimer, the term of this patent is extended or adjusted under 35 U.S.C. 154(b) by 191 days.

(21) Appl. No.: 11/781,793

(22) Filed: Jul. 23, 2007

(65) Prior Publication Data

US 2009/0027673 A1  Jan. 29, 2009

(51) Int. Cl.
*G01J 3/46* (2006.01)
(52) U.S. Cl. ...................................... 356/402; 356/406
(58) Field of Classification Search ................. 356/402, 356/406, 221, 307
See application file for complete search history.

(56) References Cited

U.S. PATENT DOCUMENTS

| | | | |
|---|---|---|---|
| 4,806,002 A | 2/1989 | Simeth et al. | |
| 5,543,922 A | 8/1996 | Runyan et al. | |
| 6,604,017 B1 * | 8/2003 | Richardson et al. | 700/223 |

FOREIGN PATENT DOCUMENTS

DE  3614092  10/1987

* cited by examiner

*Primary Examiner*—Gregory J Toatley, Jr.
*Assistant Examiner*—Abdullahi Nur
(74) *Attorney, Agent, or Firm*—McCarter & English, LLP

(57) ABSTRACT

A color measurement device includes an error detection function for color printing control. The color measurement device includes an optical measurement head, the optical measurement head being moveable linearly along a color bar region of a printing sheet, and being configured for making color measurements with respect to the color bar, and for detecting color measurement errors by determining whether such color measurements are being made at least in part with respect to regions of the printing sheet other than the color bar region. The optical measurement head may further include a pixel array for tracking a center trajectory of the color bar for purposes of detecting the color measurement errors, and a color measurement engine for purposes of making the color measurements with respect to the color bar. The color measurement device may further include a motion control element and a mechanical track to guide the optical measurement head along the color bar region.

10 Claims, 4 Drawing Sheets

COLOR MEASUREMENT DEVICE WITH ERROR DETECTION

BACKGROUND

1. Technical Field

The present disclosure generally relates to systems for providing quality control with respect to color printing production. More particularly, the present disclosure relates to devices, systems and methods for measuring the color bar of a printing sheet in conjunction with color printing press operation.

2. Background Art

Most color printing press machine manufacturers allow sheet-fed printing presses to be electronically controlled automatically via a so-called 'closed loop' system. Such a closed loop system can ensure that the inking units of the printing presses are adjusted properly so as to ensure that the desired ink density is applied, and that the plate cylinder register is adjusted properly for the correct alignment of printed color dot layers.

One well-known way of evaluating printed ink density, correlated to ink key position across the printing press, is to print a so-called 'color bar' across each sheet. A typical color bar can be a linear array of up to 100 or more color control patches. The color bar typically has a predetermined color composition and exhibits predefined geometric parameters relating to each ink control zone, as well as the position on the printing sheet.

Currently in the color printing press field, there are products that are able to rapidly measure the color bar to help automatically control the quality of color. Many of the most recent such measurement devices are configured to connect directly to closed loop system such that the associated color measurements are fed directly to software systems for making automatic adjustments to the printing press inking units. At the high end of products in this market, several intelligent systems are configured to control the position at which, or along which, color measurements are made, while simultaneously executing rapid automated scans of printed color bars. For example, the IntelliTrax system marketed by X-Rite, Inc. of Grand Rapids, Mich. includes a precision color measurement engine for color bar scanning, wherein the color measurement engine is subjected to fully automatic tracking and motion control (e.g., X and Y directional automation). Such automatic tracking of the color bar typically reduces or eliminates the need for operators to be vigilant with respect to minor misalignments as between the associated color measurement engine and the printing sheets being scanned thereby.

By contrast, with respect to the middle and lower end of quality control systems in the color printing press market, the quality of color measurement information collected from the printing sheet under scan will typically be greatly influenced by the degree to which the printing sheet is properly aligned with the associated color measurement engine. More particularly, to the extent the color information collected by a color measurement engine with respect to a target color bar incorporates or includes extraneous information collected from regions of the printing sheet that are disposed adjacent to, or that surround, the color bar, such extraneous information can render the overall color measurement associated with the particular scanning event invalid. For example, on such an occasion, the overall color measurement associated with the scanning event could report inaccurate color density values for the target color bar (e.g., color density values that are either too high or too low as compared to the true or objective color density value with which the target color bar may properly be associated).

With respect to printing press operation, the degree of confidence a user is able to place in the integrity of quality control color measurement information can be critical. In this regard, a so-called 'worst case' scenario may arise wherein a user employing a closed loop system to operate a high-speed printing press is not aware that color measurements are or have become contaminated (e.g., because of incorrect color or density feedback). In such circumstances, a large volume of printed goods that are either unusable or of degraded quality could potentially be produced in rapid succession before the user is even alerted to the problem. Such users therefore typically place a high premium on avoiding situations in which a color measurement value associated with a target color bar is inappropriately recognized or reported as valid.

Thus, despite efforts to date, effective devices, systems and methods for reducing and/or eliminating circumstances in which corrupted or contaminated color measurement information is inappropriately recognized as valid generally remain both necessary and desirable. More specifically, a particular and continuing need for such devices, systems and methods exists on the part of users employing middle to lower end quality control systems to assist in the operation of high-speed printing presses. These and other needs and desires are addressed and/or overcome by the devices, systems and methods disclosed herein.

SUMMARY

A color measurement device including an error detection function for color printing control in accordance with exemplary embodiments of the present disclosure includes an optical measurement head, the optical measurement head being moveable linearly along a color bar region of a printing sheet, and being configured for making color measurements with respect to the color bar, and for detecting color measurement errors by determining whether such color measurements are being made at least in part with respect to regions of the printing sheet other than the color bar region. In accordance with the present disclosure, the optical measurement head may further include a pixel array for tracking a center trajectory of the color bar for purposes of detecting the color measurement errors, and a color measurement engine for purposes of making the color measurements with respect to the color bar. In accordance with the present disclosure, the color measurement device may further include a motion control element and a mechanical track to guide the optical measurement head along the color bar region.

A color measurement system in accordance with embodiments of the present disclosure includes a color measurement device including an error detection function for color printing control and including an optical measurement head, the optical measurement head being moveable linearly along a color bar region of a printing sheet, and being configured for making color measurements with respect to the color bar, and for detecting color measurement errors by determining whether such color measurements are being made at least in part with respect to regions of the printing sheet other than the color bar region, the color measurement system further including application software residing in a host computer, wherein the optical measurement head is further configured to support bidirectional data communication with the application software. In accordance with the present disclosure, the optical measurement head may further include a pixel array for tracking a center trajectory of the color bar for purposes of detecting the color measurement errors, and the application software may be configured to interpret color data generated by the optical measurement head, and to simultaneously interpret error detection pixel data generated by the optical measurement head.

A color measurement system including an error detection function for color printing control in accordance with exemplary embodiments of the present disclosure includes an optical measurement head for moving linearly along a color bar on a printed sheet and measuring the color bar, a mechanical track with linear motion means, and a host computer with software configured to receive color measurement data from the optical measurement head and to actively monitor a validity of the color measurement data. In accordance with the present disclosure, the software may be further configured to prevent invalid color bar measurements from being forwarded to printing press control units. In accordance with the present disclosure, the software may be further configured to provide user feedback with respect to realignment actions required to enable valid color bar measurements during a consecutive measurement of a plurality of printed sheets of a printing press run job. In accordance with the present disclosure, the software may be further configured to provide user feedback with respect to physical printed sheet alignment actions required to enable valid color bar measurements.

BRIEF DESCRIPTION OF FIGURES

To assist those of ordinary skill in making and using the disclosed devices, systems, and methods, reference is made to the accompanying figures, wherein.

DESCRIPTION OF EXEMPLARY EMBODIMENT(S)

Figure 1:
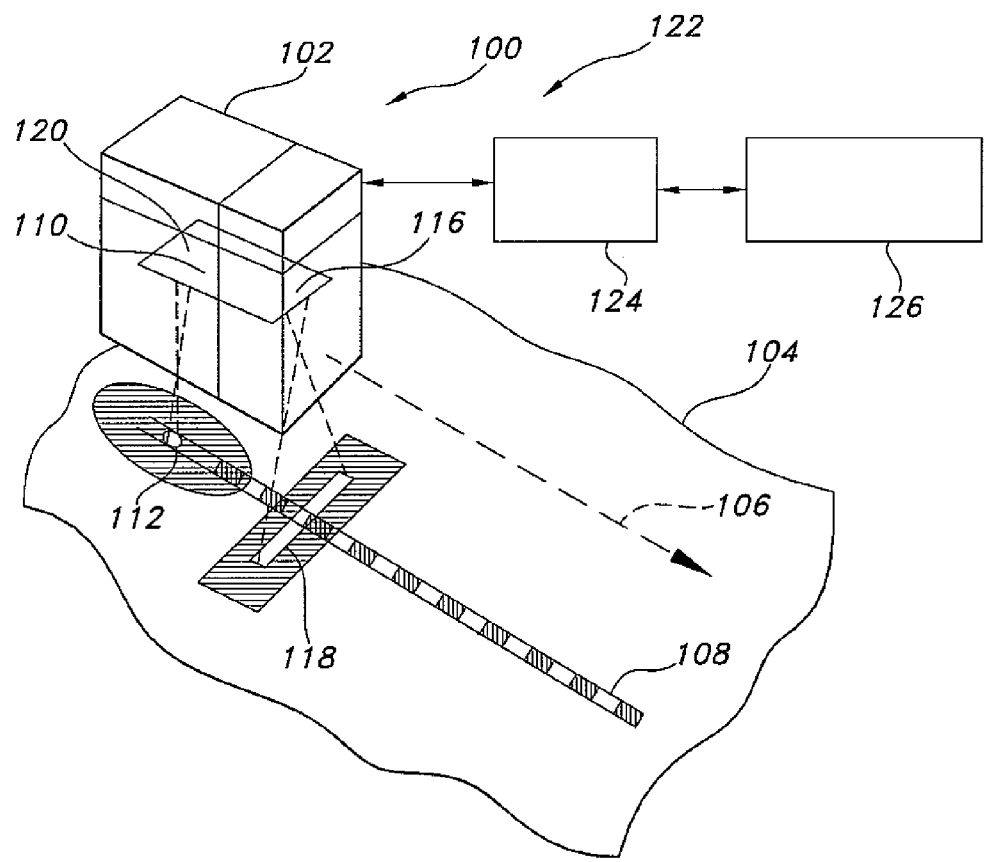
FIG. 1 is a schematic, isometric side view of a portion of a color measurement device in accordance with exemplary embodiments of the present disclosure, wherein the color measurement device includes an optical measurement head and is operable to scan a color bar of a printing sheet.

The disclosed devices, systems and methods may facilitate the employment of quality control systems by operators of printing presses and/or other similar equipment. Individual color measurement devices in accordance with exemplary embodiments of the present disclosure may be adapted to communicate color measurement information to ancillary programs, instruments, and/or host computer applications (e.g., quality control applications) on an automatic and efficient basis, and may further include an error detection function for detecting printing sheet misalignment conditions and/or other types of misalignment conditions, potentially leading to corruption or contamination of color measurement information, and providing operators with prompt error indications to facilitate timely commencement of necessary remedial actions.

The disclosed devices, systems, and methods may further provide an economical, quick, easy, and user-intuitive method of making reliable color bar measurements, with an integrated error detection function operable in an automatic mode to detect whether the optical collection of information associated with a color bar and/or with any of the color control patches thereof may be contaminated with invalid information associated with adjacent or surrounding regions of the printing sheet.

The disclosed devices, systems, and method may advantageously be implemented with respect to color information collection schemes which do not necessarily allow for automated motion in the Y direction, but rather, allow for rapid X direction color bar scanning with simultaneous detection of color bar edge locations, quality control measurements, and active host software evaluation of color and density data, as well as location validity. Further, the disclosed devices, systems, and methods may enable a relatively unskilled operator to reliably and consistently set up and measure color bars with reproducible alignment to an associated color measurement field of view.

In accordance with exemplary embodiments of the present disclosure, devices, systems, and methods are provided for enhancing quality control of color printing production, e.g., via easily and effectively detecting measurement errors during a scan of a color bar located on a printing sheet. Such devices, systems and methods may be substantially easy to adopt into current printing press processes and may be of relatively lower cost as compared to existing, fully automated tracking designs.

For purposes of the present disclosure, the term "color measurement information" may encompass any and all data, information and/or values that are collected and/or generated by a color measurement device, e.g., a spectrophotometer, calorimeter or densitometer, with respect to printing sheets under scan. Thus, for example, values obtained from such color measurement determinations, and corrections and/or adjustments to such color measurement values may be included within the term "color measurement information."

According to exemplary embodiments of the present disclosure, color measurement devices adapted to make color measurements and/or capture color measurement values may be provided. Such color measurement devices may take various forms. Thus, for example, such color measurement devices may include spectrophotometers, calorimeters and/or densitometers. Such color measurement devices may further include or communicate with a processor and/or a group of processors. The design and operation of such processor or processors may not necessarily be critical to the present disclosure. Thus, conventional processor hardware may be employed according to the present disclosure, e.g., one or more microprocessors, BIOS chips(s), CMOS chip(s) and associated memory (e.g., in the form of a hard drive and/or ancillary memory storage).

Referring now to FIG. 1, a color measurement device 100 in accordance with exemplary embodiments of the present invention may include, among other aspects (not necessarily shown in FIG. 1) an optical measurement head 102. For example, the color measurement device 100 may be configured and/or adapted as necessary and/or as desired to permit the optical measurement head 102 to be moved via an axial or vector motion translation across a printing sheet 104 along a direction 106. In accordance with exemplary embodiments of the present disclosure, the direction 106 may be vertically aligned with a corresponding linear extent of a color bar 108 associated with the printing sheet 104.

The optical measurement head 102 may include a color measurement engine 110. The color measurement engine 110 may be configured and/or adapted to permit the optical measurement head 102 to execute color measurements with respect to the color bar 108 of the printing sheet. More particularly, with respect to a plane containing the printing sheet 104 and the color bar 108 associated therewith, the color measurement engine 110 may exhibit a color measurement field of view 112, wherein a size of the color measurement field of view 112 within such plane may be scaled to match that of the color bar 108, as will be discussed in greater detail below.

The optical measurement head 102 may also include a pixel array 116. The pixel array 116 may be configured and/or adapted to provide an error detection function that permits the optical measurement head 102 to detect whether color measurements of the color bar 108 being taken by the color measurement engine 110 are being or have been contaminated. For example, the pixel array 116 may be configured and/or adapted to detect a misalignment of the printing sheet 104 with respect to the color measurement device 100 and/or the optical measurement head 102 thereof, and/or a misalignment with respect to a registration of an inking unit (not shown) with respect to the printing sheet 104. More particularly, with respect to a plane containing the printing sheet 104 and the color bar 108 associated therewith, the pixel array 116 may exhibit a pixel array field of view 118. In accordance with exemplary embodiments of the present disclosure, the color measurement field of view 112 of the color measurement engine 110 may be factory calibrated to the pixel array field of view 118, e.g., to facilitate unit-to-unit precision alignment. As discussed in greater detail below, the pixel array 116 may be operable to monitor an effective scanning trajectory of the color measurement engine 110.

The optical measurement head 102 may also include an on board memory 120. For example, the on board memory 120 may be a memory unit of any type suitable for storing calibration and/or offset information, e.g., for purposes of allowing a host computer to take advantage of such information, as discussed in greater detail below.

Still referring to FIG. 1, the color measurement device 100 may be incorporated within a control system 122. The control system 122 may be a closed loop control system operable by a user or operator to perform quality control with respect to a color printing press (not shown). The control system 122 may further include a host computer 124 and a printing press controller 126. The host computer 124 may be coupled to the color measurement device 100 and/or to the optical measurement head 102 thereof via well known data bus architectures such as USB and/or Ethernet. Wireless connectivity may be utilized for such purposes as well, and/or in the alternative. The host computer 124 may further include executable program code provided in the form of computer software, firmware, hardware, and/or a combination thereof, for permitting the host computer 124 to take advantage of the calibration and/or offset storage information contained within the on board memory 120 of the optical measurement head 102. With such information, the host computer 124 and/or the executable program code embodied in the software, firmware, and/or hardware thereof, may alert an end user if the color measurement engine 110 has been exposed to invalid information, as discussed in greater detail below.

Figure 2:
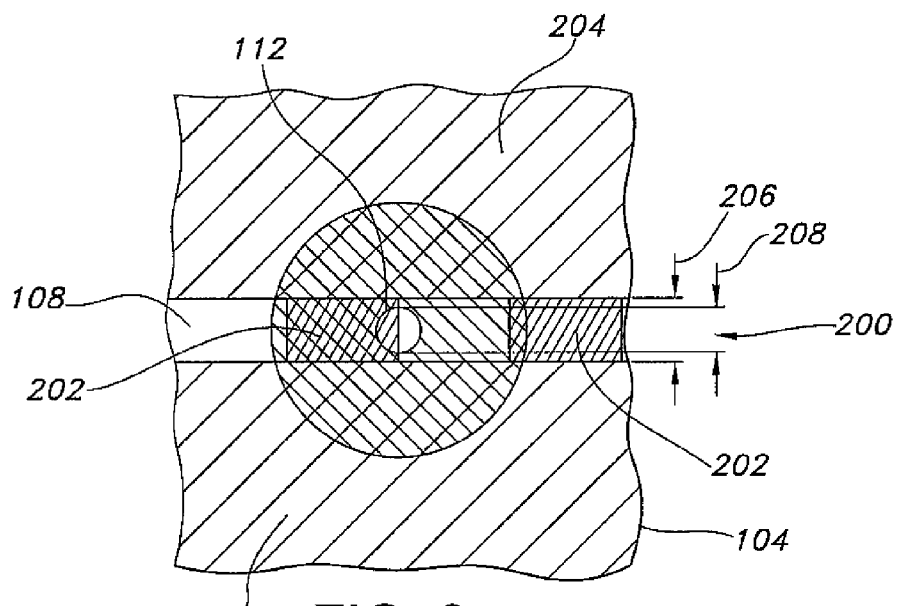
FIG. 2 is a detail view of a color measurement field of view associated with the optical measurement head of FIG. 1, wherein the color measurement field of view is projected in a sample plane including the target color bar of the printing sheet of FIG. 1 in accordance with exemplary embodiments of the present disclosure.

Referring now to FIG. 2, in accordance with exemplary embodiments of the present disclosure, a user (e.g., a printing press operator) may position the printing sheet 104 such that the color measurement field of view 112 properly measures exclusively within a valid measurement region 200 associated with designated color control patches 202 associated with the color bar 108. Proper positioning of the color measurement field of view 112 with respect to the color bar 108 as shown in FIG. 2 may permit the color measurement engine 110 (FIG. 1) of the optical measurement head 102 (FIG. 1) to execute appropriate measurements exclusively within the valid measurement region 200, and may also substantially prevent the color measurement engine 110 from collecting extraneous information associated with regions 204 of the printing sheet 104 other than the color bar 108 (e.g., associated with surrounding or adjacent regions relative to the color bar 108). More particularly, proper positioning of the color measurement field of view 112 with respect to the color bar 108 as shown in FIG. 2 may serve to prevent adjacent or surrounding information from the regions 204 from being mixed or otherwise added to information from the color bar 108, e.g., in such a way as to influence, contaminate, and/or corrupt the resultant color information measurement, and/or the associated color information measurement value. As discussed in greater detail below, to the extent a sufficient misalignment exists and/or develops as between the color measurement field of view 112 and the color bar 108, invalid measurements and/or poor printing press operation may ensue.

As relates to the valid measurement region 200 associated with the designated color control patches 202, a common color bar height (e.g., Y dimension) may result in the valid measurement region 200 exhibiting a height having a length extent (indicated at 206) of approximately 5 millimeters, though other sizes and/or color bar heights may be utilized. In such circumstances, a color measurement field of view 112 of an appropriate size may exhibit a diameter having a length extent (indicated at 208) of approximately 3 millimeters, leaving approximately 1 millimeter on either side of the color measurement field of view 112 to account for all possible physical alignment and/or other variations as between different printed sheets 104. Mechanical system tolerances, as well as the typical human visual alignment capability, may allow for successful scanning operation of such defined-height color bars within a corresponding calculated error budget of the color measurement engine 110 (FIG. 1).

Figure 3:
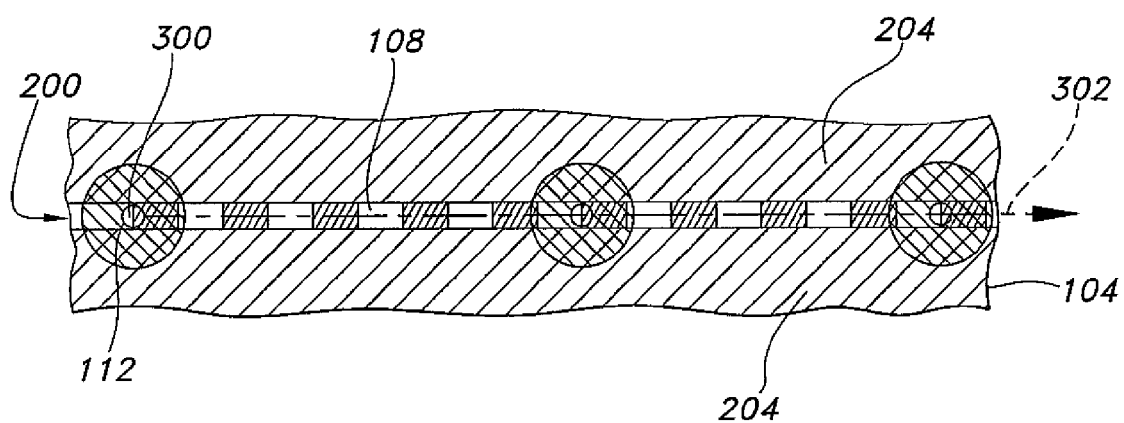
FIG. 3 shows an example of a scan of the printing sheet of FIGS. 1 and 2 performed using the color measurement device of FIG. 1 in accordance with exemplary embodiments of the present disclosure, wherein the color measurement information obtained via such scan is collected substantially entirely from the target color bar of FIGS. 1 and 2, and thus, may potentially be valid.

Referring now to FIG. 3, the color measurement device 100 (FIG. 1) may be operable to position the optical measurement head 102 (FIG. 1) in a proper position with respect to the color bar 108, and to move the optical measurement head 102 along the color bar 108 during a given scanning instance or scanning session, such that a center point 300 associated with the color measurement field of view 112 describes a centerline 302 coinciding more or less squarely with a corresponding centerline (not otherwise shown) associated with the valid measurement region 200. In such circumstances, corrupting information from the regions 204 of the printing sheet 104 adjacent to or surrounding the color bar 108 may be substantially excluded from such color measurement information as may result from such scanning instance.

Figure 4:
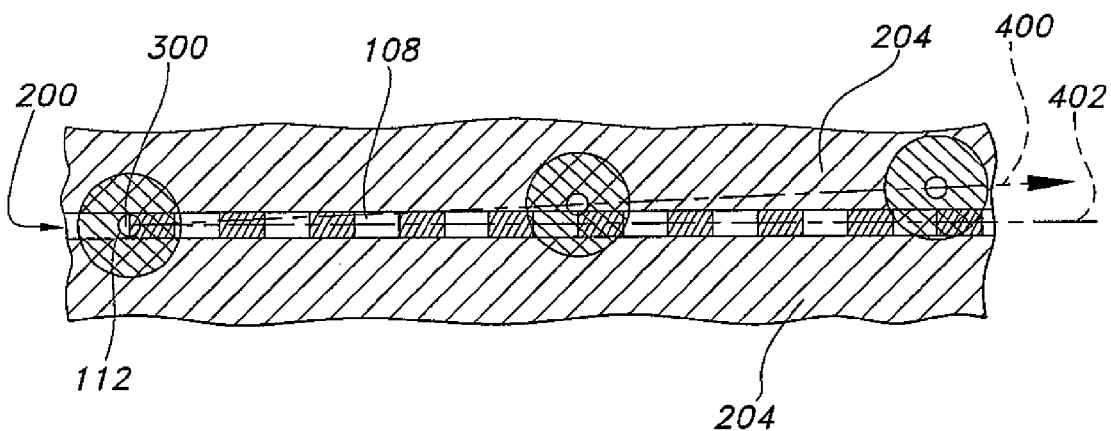
FIG. 4 shows an example of a scan of the printing sheet of FIGS. 1 and 2 performed using the color measurement device of FIG. 1 in accordance with exemplary embodiments of the present disclosure, wherein the color measurement information obtained via such scan is collected at least in part from regions of the printing sheet adjacent to and/or surrounding the target color bar of FIGS. 1 and 2, and thus, may potentially be invalid.

Referring now to FIG. 4, the color measurement device 100 (FIG. 1) may, in at least some circumstances, position the optical measurement head 102 (FIG. 1) in an improper position with respect to the color bar 108, such that as the color measurement device 100 moves the optical measurement head 102 along the color bar 108 during a given scanning instance or scanning session, the center point 300 associated with the color measurement field of view 112 may describes a centerline 400 that fails to coincide with a corresponding centerline 402 associated with the valid measurement region 200. In such circumstances, corrupting information from the regions 204 of the printing sheet 108 adjacent to or surrounding the color bar 108 may not be excluded from the color measurement information resulting from such scanning instance. Rather, in such circumstances, such corrupting information may be added to and/or mixed with otherwise valid color measurement information associated with the color bar 108, potentially resulting in an invalid color measurement value. As indicated above, in accordance with exemplary embodiments of the present disclosure, the host computer 124 (FIG. 1) of the control system 122 (FIG. 1) may be configured to alert an end user that the color measurement engine 110 (FIG. 1) of the color measurement device 100 (FIG. 1) has been exposed to invalid information. For example, the host computer 124 (FIG. 1) may be configured to provide appropriate feedback to a printing press operator, wherein such feedback may include signals to prompt the operator to readjust an alignment of the printing sheet 104 (FIG. 1) relative to the color measurement device 100 (FIG. 1) in order to begin and/or resume valid color measurement scanning, as will be described in greater detail below.

Figure 5:
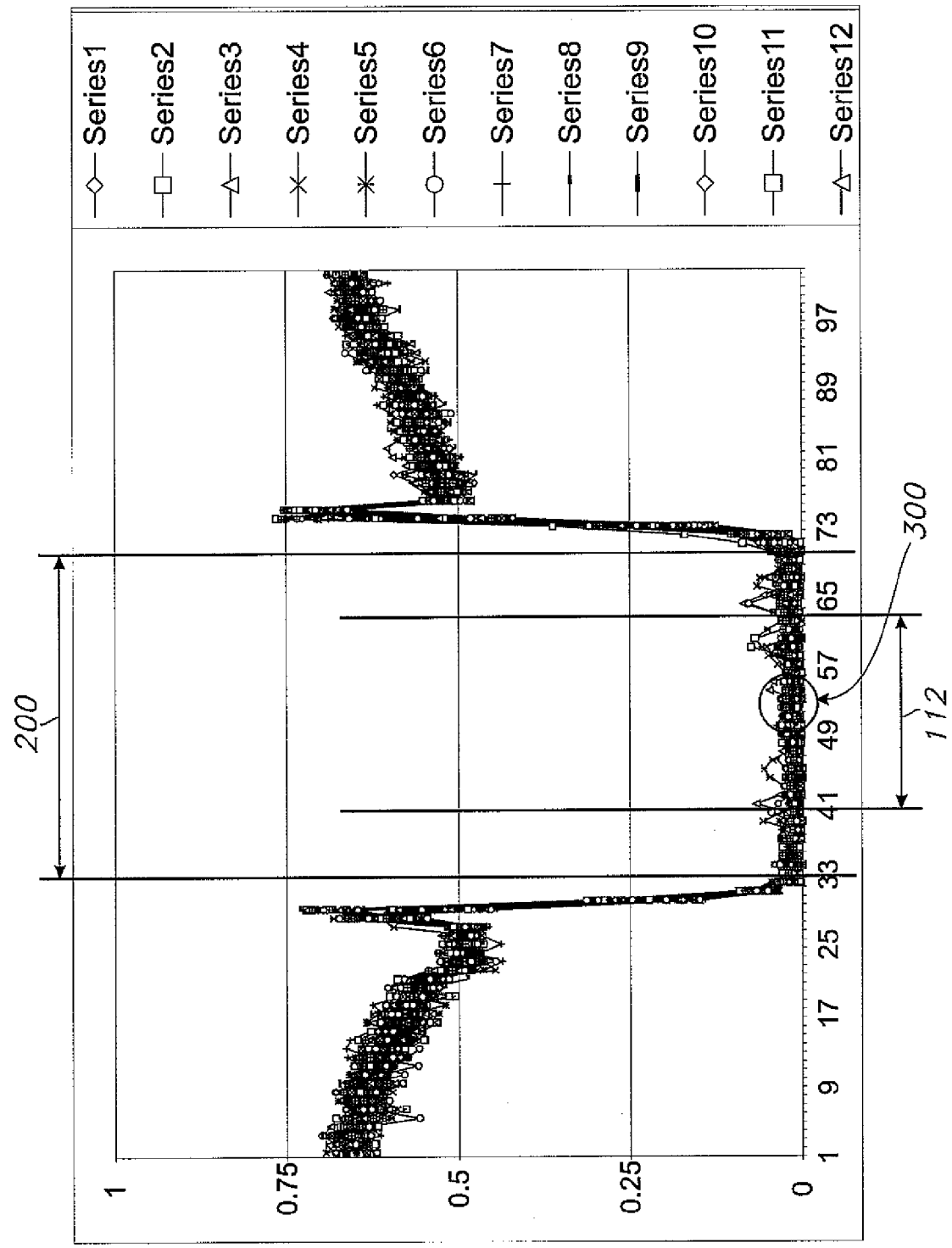
FIG. 5 shows a graphical depiction of color measurement information collected from the printing sheet of FIGS. 1 and 2 using the color measurement device of FIG. 1 in accordance with exemplary embodiments of the present disclosure, and generally showing wherein the color measurement field of view associated with the optical measurement head of FIG. 1 may be aligned with the target color bar of FIGS. 1 and 2.

Turning now to FIG. 5, a graphical depiction of data is provided that shows at least temporary proper alignment of the known centerpoint 300 of the color measurement field of view 112 within the valid measurement region 200 associated with the color bar 106 (FIG. 1). Alternatively, information (not shown) of a similar format but, by contrast, tending to indicate at least temporary improper alignment of the known centerpoint 300 within the valid measurement region 200, may be utilized, for example, by the host computer 124 (FIG. 1) to provide the above-discussed appropriate feedback to a printing press operator, e.g., in the form of an appropriate error alert.

Figure 6:
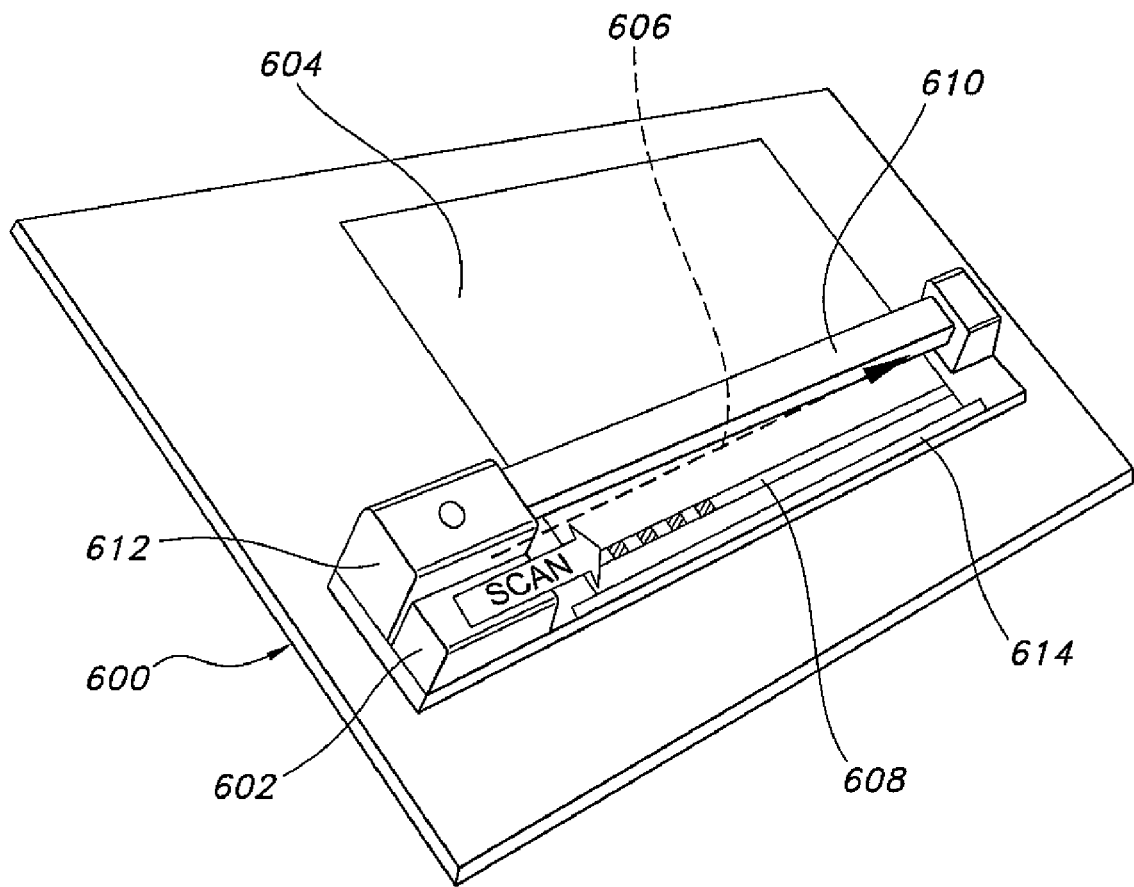
FIG. 6 is a perspective side view of a variation of the color measurement device of FIG. 1 in accordance with exemplary embodiments of the present disclosure.

As shown in FIG. 6, a variation of the color measurement device 100 (FIG. 1) is shown in the form of a color measurement device 600 in accordance with exemplary embodiments of the present disclosure. The color measurement device 600 may be similar to the color measurement device 100 (FIG. 1) in most or all important respects. For example, the color measurement device 600 may include an optical measurement head 602 substantially similar to the optical measurement head 102 shown and described above with respect to FIG. 1 (e.g., including being movable across a printing sheet 104 along a linear translation path 606 to provide color measurement information with respect to a color bar 608 thereof), and/or may be configured to connect with a host computer (not shown) substantially similar to the host computer 124 described above, and/or may form part of a control system (not otherwise shown) substantially similar to the control system 122 described above. The color measurement device 600 may further include additional aspects and features in addition to those described above with respect to the color measurement device 100 (FIG. 1), as will now be described.

The color measurement device 600 may include a mechanical track 610, and a motion control element 612 to which the optical measurement head 602 may be coupled, and that may enable the optical measurement head 602 to be moved in translation along the mechanical track 610 and across the color bar 608. As also shown in FIG. 6, the color measurement device may further include a printing sheet reference stop 614. The printing sheet reference stop 614 may be positionally and/or orientationally adjustable relative to the mechanical track 610, such that, in the event a user receives the above-discussed appropriate feedback from the host computer 124 (FIG. 1), the user may undertake such adjustments to a position and/or an orientation of the printing sheet reference stop 614 as are necessary and/or desirable to begin and/or resume valid color measurement scanning.

Although the foregoing devices, systems and methods have been described herein with reference to exemplary embodiments and implementations thereof, it is to be understood that the present disclosure is not limited by or to such exemplary embodiments. Rather, the devices, systems and methods of the present disclosure are susceptible to various modifications, variations and/or enhancements without departing from the spirit or scope hereof. Accordingly, the present disclosure expressly encompasses within its scope all such modifications, variations and/or enhancements.

The invention claimed is:

1. A color measurement device including an error detection function for color printing control, comprising:
    an optical measurement head, the optical measurement head being moveable linearly along a color bar region of a printing sheet, and being configured for making color measurements with respect to the color bar, and for detecting color measurement errors by determining whether such color measurements are being made at least in part with respect to regions of the printing sheet other than the color bar region.

2. The color measurement device in accordance with claim 1, wherein the optical measurement head further comprises a pixel array for tracking a center trajectory of the color bar for purposes of detecting the color measurement errors.

3. The color measurement device in accordance with claim 1, wherein the optical measurement head further comprises a color measurement engine for purposes of making the color measurements with respect to the color bar.

4. The color measurement device in accordance with claim 1, further comprising a motion control element and a mechanical track to guide the optical measurement head along the color bar region.

5. A color measurement system including the color measurement device in accordance with claim 1, and further comprising application software residing in a host computer, wherein the optical measurement head is further configured to support bidirectional data communication with the application software.

6. The color measurement system in accordance with claim 5, wherein the optical measurement head further comprises a pixel array for tracking a center trajectory of the color bar for purposes of detecting the color measurement errors, and wherein the application software is configured to interpret color data generated by the optical measurement head, and to simultaneously interpret error detection pixel data generated by the optical measurement head.

7. A color measurement system including an error detection function for color printing control, comprising:
- an optical measurement head for moving linearly along a color bar on a printed sheet and measuring the color bar;
- a mechanical track with linear motion means; and
- a host computer with software configured to receive color measurement data from the optical measurement head and to actively monitor a validity of the color measurement data;
- wherein the software configured to actively monitor the validity of the color measurement data includes software configured to determine whether measurements of the color bar are being made at least in part with respect to regions of the printing sheet other than the color bar region.

8. The color measurement system in accordance with claim 7, wherein the software is further configured to prevent invalid color bar measurements from being forwarded to printing press control units.

9. The color measurement system in accordance with claim 7, wherein the software is further configured to provide user feedback with respect to realignment actions required to enable valid color bar measurements during a consecutive measurement of a plurality of printed sheets of a printing press run job.

10. The color measurement system in accordance with claim 7, wherein the software is further configured to provide user feedback with respect to physical printed sheet alignment actions required to enable valid color bar.

* * * * *